(No Model.)

A. P. DE SENNEVOY.
APPARATUS FOR RECUTTING FILES.

No. 448,144. Patented Mar. 10, 1891.

Witnesses:
J. B. McGivr.
F. T. Chapman

Inventor,
Augustin Personne de Sennevoy,
By Joseph Lyon
Attorney.

UNITED STATES PATENT OFFICE.

AUGUSTIN PERSONNE DE SENNEVOY, OF PARIS, FRANCE.

APPARATUS FOR RECUTTING FILES.

SPECIFICATION forming part of Letters Patent No. 448,144, dated March 10, 1891.

Application filed December 15, 1890. Serial No. 374,749. (No model.) Patented in France May 14, 1888, No. 189,311.

*To all whom it may concern:*

Be it known that I, AUGUSTIN PERSONNE DE SENNEVOY, a citizen of the Republic of France, and a resident of Paris, in the Republic of France, have invented certain new and useful Improvements in Recutting Files, (for which I have obtained Letters Patent in France, dated May 14, 1888, and numbered 189,311,) of which the following is a specification.

My invention has reference to improvements in the method of and apparatus for recutting files, rasps, and other like cutting-instruments, and other articles having sharp or pointed portions upon their surfaces; but the invention is also applicable, as will hereinafter more fully appear, to the recutting of engravings on steel, copper, zinc, or other metals, and to the re-etching of steel and copper plates and to the renovation of damaskened articles.

Broadly speaking, the invention consists in constituting the article to be recut or renovated the positive electrode or the negative pole of an electric battery, the negative electrode or positive pole of which may be made of any suitable material. The renovating-battery being thus made, its circuit is closed, preferably, by a short heavy conductor, or, in other words, the battery is short-circuited. The effect of this is that the current passing within the battery from the article to be recut or renovated to the other electrode a thin film of the metal of the article is stripped off by electrolytic action, and I have found by experience that in this manner the depressed portions of the article are mainly attacked, the raised and especially the pointed portions being very slightly attacked, since, as I have found, the hydrogen evolved in the battery attaches itself to these raised and pointed portions and protects them, in a measure, against electrolytic action. All this will more fully appear from the following detailed description, in which reference is made to the accompanying drawings, in which I have illustrated one of the many forms which my apparatus may assume.

Figure 1:
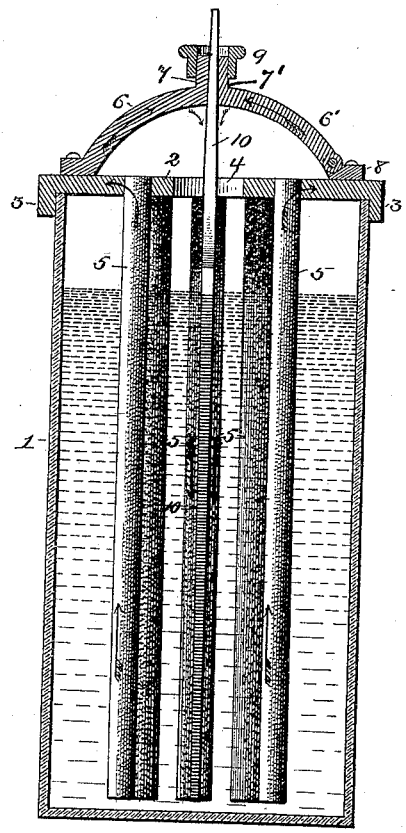
Figure 2:
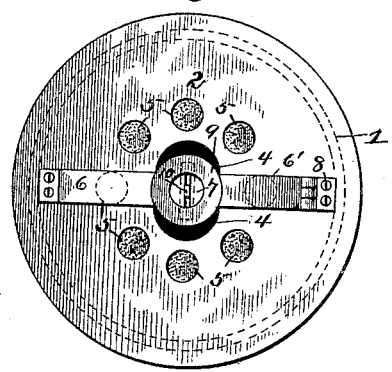

The drawings show in Figure 1 a vertical section of an electrolytic recutting-battery embodying my invention, and Fig. 2 is a top plan view of the same.

The jar 1 of the recutting-battery, made of glass or other insulating material, has the shape and size suited for the particular article or articles operated upon. If the article is a file or rasp 10, as is the case assumed in the construction of the apparatus shown, the jar is preferably cylindrical, of comparatively small diameter, and of a height corresponding to the cut portion of the file or rasp. A cover 2 of metal, being in this instance a disk with a dependent flange 3, is fitted to the jar, so as to be held thereon with slight friction. In this disk-cover there is formed a slot 4 of a shape which will permit the easy entrance therethrough of the file, rasp, or other article 10, and mounted in said disk in a circular row are electrodes 5 5, &c., which surround the slot 4. The material for these electrodes 5 is such that if immersed in an electrolyte it will form the negative electrode or positive pole of the battery, of which the file, rasp, or other article 10 is the positive electrode or negative pole.

Since in the electric-tension series carbon is electro-negative with respect to the majority of other solid substances, the electrodes 5 are preferably made of carbon; but I desire it to be understood that I am not necessarily confined to carbon. These negative electrodes are preferably made as cylindrical rods and removably fixed in any desired or improved manner in the cover 2, as shown. A bracket 6 is mounted upon the cover, or, if so desired, may be cast in one piece with the same, and this bracket rising from the cover extends radially over the same, with its free end 7 shaped like one jaw of a clamp, adapted to clamp the tang of the file or rasp 10 and in alignment with the slot 4. Diametrically opposite the point where the bracket 6 rises from the cover there is a lug 8, to which a bracket 6', shaped in all respects like the bracket 6, is pivoted—that is to say, it is formed with a clamp-jaw 7' at its free end. The outer faces of the two clamp-jaws 7 7' are made slightly conical, and when the tang of the file or rasp 10 is inserted between the jaws a sleeve 9 is passed over said jaws and serves as a friction-lock for the same and for the file or rasp, which is thus securely held between the brackets 6 6' and extends down into the jar, similar in this respect to the zinc electrode of a Grenet cell.

An apparatus thus constructed is used for carrying out my process as follows: An electrolytic fluid of such character that it will slightly attack the article to be operated upon is poured into the jar. The article itself is cleansed of grease and other impurities and is clamped between the jaws 7 7' of the brackets 6 6' in the manner hereinbefore described, and for this purpose the cover with its attached carbon-rods may be removed from the jar. As soon as the cover is replaced upon the jar the whole structure becomes an electric battery, of which the carbon rods constitute the negative electrodes and the file 10 the positive electrode. The current within the fluid will therefore pass in multiple-arc branches from the file to the different carbon rods, while in the external circuit the current will be from the ends of the carbon rods through the disk and bracket 6 6' to the tang of the file, as indicated by the arrows marked in the drawings. The battery is thus short-circuited, and the electrolytic action causes a stripping of material from the file, and the hydrogen evolved is carried over to the carbon electrodes, rises along the same, and eventually escapes through the slot 4. I have found, however, that if a battery is short-circuited upon itself some of the hydrogen attaches itself and tenaciously adheres to the projecting or pointed portions of the positive electrode, so that in the case where the article is a file or rasp hydrogen bubbles are held back and cover the points or edges of the teeth, thus protecting the same against continued electrolytic action, while said action continues uninterruptedly within the cuts or depressed portions of the teeth, thus restoring the original depth of the cut. A similar action takes place when the article operated upon is an engraving or any other structure having depressed and elevated portions; but this action is more pronounced when the elevated portions are sharp or pointed, as is the case in files and rasps.

For recutting files the electrolytic fluid employed in order to obtain the best results is composed of one hundred parts of water, six parts of nitric acid, and three parts of sulphuric acid, all measured by volume, and the same electrolytic fluid may be employed with advantage in the renovation of steel engravings and whenever the article operated upon is of iron or steel.

It will be understood that the whole process of recutting files occupies only a few minutes of time, and that the files or other articles operated upon must be rapidly withdrawn from the bath and thoroughly washed and freed from acid by any of the ordinary and well-known methods.

Having now fully described my invention, I claim and desire to secure by Letters Patent—

1. A file-recutting battery composed of a file constituting the positive electrode, a series of negative electrodes, a suitable electrolytic fluid, and an external short circuit, substantially as described.

2. In a file-recutting battery, the combination of a file constituting the positive electrode, a series of carbons surrounding the file and constituting the negative electrode, and an electrolytic fluid composed of water, nitric acid, and sulphuric acid, substantially as described.

3. In a recutting-battery, the combination of an electrolytic fluid, the article to be recut constituting the positive electrode, a suitable negative electrode, and a clamp for the article constituting an external short circuit for the battery, substantially as described.

4. A recutting-battery composed of an article to be recut constituting the positive electrode, a negative electrode, a suitable electrolytic fluid, and an external short circuit, substantially as described.

In testimony whereof I have signed my name to this specification in the presence of two subscribing witnesses.

AUGUSTIN PERSONNE DE SENNEVOY.

Witnesses:
GASTON DE VERNON DE BONNEÜIL,
PERSONNE DE SENNEVOY.